Sept. 12, 1933.  W. KNUDSEN  1,926,746
TRACTION LUG
Filed May 7, 1930
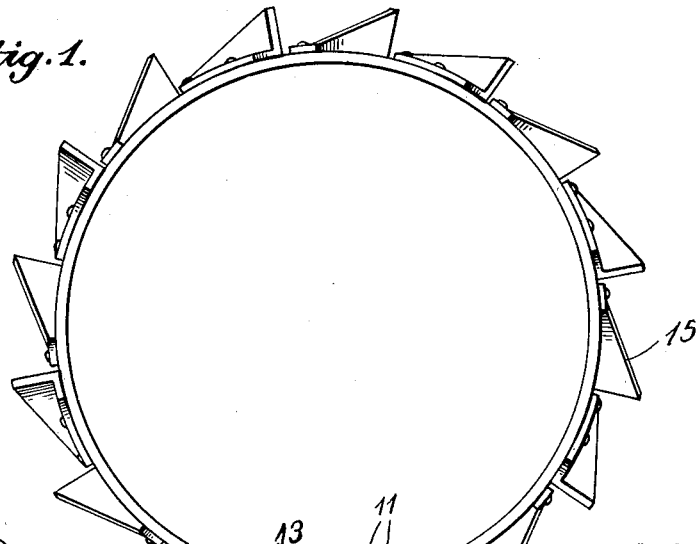
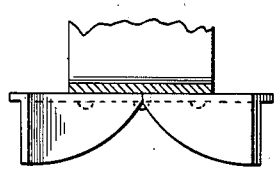
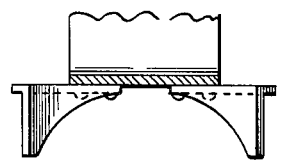
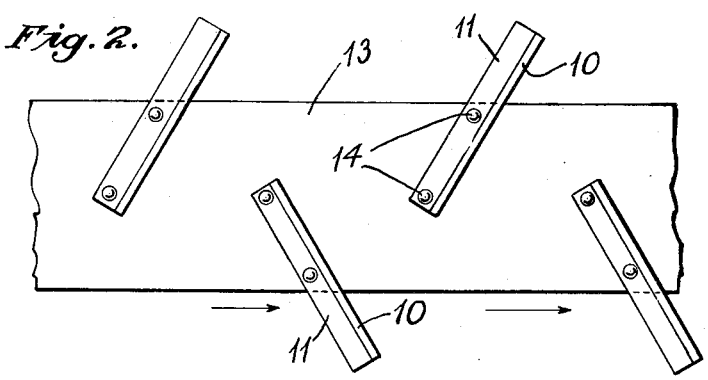
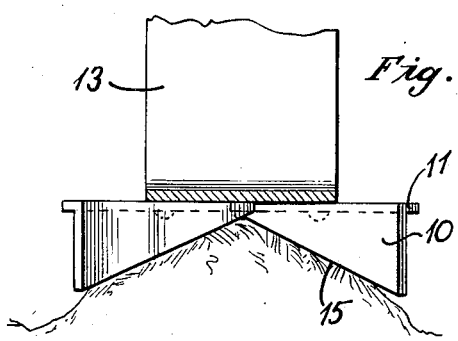
Inventor
William Knudsen
By Knight Bro
Attorney Patented Sept. 12, 1933

1,926,746

UNITED STATES PATENT OFFICE 1,926,746

TRACTION LUG

William Knudsen, Fremont, Nebr.

Application May 7, 1930. Serial No. 450,557

1 Claim. (Cl. 301—43)

The present invention relates to grippers adapted to be secured to the rims or treads of tractor wheels and the like. The primary object of the invention is to so arrange the grippers on the wheel rim of a tractor with respect to its direction of travel that lateral forces result in a symmetrical arrangement, or tend to result in such, when the wheel travels on ridged soil surfaces. The grippers have radial flanges which may be of substantially triangular shape and are mounted alternately upon opposite sides of the middle of the rim, so that when the wheel is viewed tangentially, the ground engaging edges of the grippers may form angles with their apices substantially at the middle of the rim and their sides diverging from the wheel axis. The grippers are arranged alternately on opposite sides of the middle of the rim and are inclined oppositely and symmetrically with respect to the direction of travel of the wheel. They are inclined so that on the ground engaging portion of the wheel the outer ends of the grippers are to the rear of the ends at the middle of the rim. This gives the reaction of each gripper against the ground a transverse component tending to move the wheel laterally toward the side of the rim on which the gripper is located. Since the grippers are inclined oppositely and symmetrically these transverse components normally balance each other. If the wheel is riding along the middle of a ridge, such as a corn row, any slipping of the wheel to one side will be accompanied by a decrease in surface areas of the grippers which are engaging the ground on that side and an increase in the surface areas of the grippers which are engaging the ground on the other side, due to the diagonal disposition of the grippers with relation to the direction of wheel rotation. The transverse components will thereby become unbalanced and the wheel will be moved back to the middle of the row. The wheel is thus enabled to ride a ridge, such as a corn row, without falling off and secures efficient traction under such condition.

In the accompanying drawing, illustrative of the invention,

Fig. 1 is an elevation of a wheel rim equipped with the improved grippers,

Fig. 2 is a developed plan view of a portion of the outer periphery of the rim of Fig. 1, Fig. 3 is a section through the wheel rim on a line parallel to its axis, and Figs. 4 and 5 are detail sections showing two modifications of the lugs.

Referring to the drawing, each gripper comprises a substantially triangular web 10 having a rectangular flange 11 extending along one of its edges. The flange has a suitable curvature so as to fit closely across the periphery of wheel rim 13 diagonally to a line parallel to the rim axis, with the web in radially projecting relation to the rim. The ratio of the length of the grippers to the width of the wheel rim may be varied as desired, but, in the example shown, each gripper extends substantially from the middle of the rim to a point beyond the edge of the rim, adjacent grippers projecting in opposite directions with the ground engaging edges 15 of their webs diverging from the wheel axis outwardly from the middle of the rim. The gripper flanges 11 are secured to the rim by means of bolts, rivets, or the like, 14. Figs. 4 and 5 show two modified forms of the traction lugs, from which it will be evident that the ground engaging edges may be curved as well as straight. The terms used in this specification are intended to cover such forms as well, the curved lines being substantially equivalent to straight lines following the same average direction.

The diagonal disposition of the ground engaging webs of the grippers with respect to the direction of wheel rotation makes the wheel hold to the ridge or corn row upon which it is running, in the manner previously explained. The arrangement and form of the grippers may be considerably varied without departing from the spirit of my invention, so long as they fall within the description in the following claim.

Having thus described my invention, I claim:

A vehicle supporting wheel for travel on narrow soil ridges, comprising a rim; a plurality of grippers comprising two groups of outwardly extending flanges, one group being on one side of the median plane of said rim and the other group on the opposite side thereof; the flanges in said two groups being oppositely and symmetrically inclined to said plane in such a way that the outer ends of said flanges, on the ground engaging side of said rim, are to the rear of the ends adjacent the middle of said rim, with respect to the normal direction of travel of said rim, said groups of flanges being adapted to exert forces against the soil ridge engaged by them which tend to hold the wheel in stable equilibrium on the ridge.

WILLIAM KNUDSEN.